(12) United States Patent
Markman et al.

(10) Patent No.: US 7,421,042 B2
(45) Date of Patent: Sep. 2, 2008

(54) CARRIER TRACKING LOOP LOCK DETECTOR

(75) Inventors: Ivonete Markman, Carmel, IN (US); Gabriel Alfred Edde, Indianapolis, IN (US)

(73) Assignee: Thomson Licensing, Boulogne Billancourt (FR)

(*) Notice: Subject to any disclaimer, the term of this patent is extended or adjusted under 35 U.S.C. 154(b) by 599 days.

(21) Appl. No.: 10/536,055

(22) PCT Filed: Nov. 12, 2003

(86) PCT No.: PCT/US03/35941

§ 371 (c)(1), (2), (4) Date: May 24, 2005

(87) PCT Pub. No.: WO2004/049706

PCT Pub. Date: Jun. 10, 2004

(65) Prior Publication Data

US 2006/0146954 A1    Jul. 6, 2006

Related U.S. Application Data

(60) Provisional application No. 60/429,367, filed on Nov. 26, 2002.

(51) Int. Cl.
*H04L 27/16* (2006.01)
(52) U.S. Cl. .................. 375/326; 375/344; 375/373
(58) Field of Classification Search .......... 375/324, 375/326, 327, 340, 344, 371, 373, 375, 376; 348/500, 512, 516, 525, 536; 370/500; 327/141, 327/147, 156
See application file for complete search history.

(56) References Cited

U.S. PATENT DOCUMENTS

| 4,704,582 | A  | * | 11/1987 | Dixon et al. | 329/308 |
| 5,568,521 | A  | * | 10/1996 | Williams et al. | 375/344 |
| 5,692,014 | A  | * | 11/1997 | Basham et al. | 375/326 |
| 6,005,640 | A  |   | 12/1999 | Strolle et al. | |
| 6,233,295 | B1 | * | 5/2001  | Wang | 375/364 |
| 6,697,609 | B2 | * | 2/2004  | Wakamatsu et al. | 455/260 |
| 2001/0022813 | A1 |   | 9/2001 | Tan et al. | |

OTHER PUBLICATIONS

United States Advanced Television Systems Committee, "ATSC Digital Television Standard", Document A/53, Sep. 16, 1995, pp. 1-74.
United States Advanced Television Systems Committee, "Guide to the Use of the ATSC Digital Television Standard", Document A/54, Oct. 4, 1995; pp. 1-148.
Search Report dated Jun. 7, 2004.

* cited by examiner

*Primary Examiner*—Dac V Ha
(74) *Attorney, Agent, or Firm*—Joseph J. Laks; Paul P. Kiel; Joseph J. Opalach

(57) ABSTRACT

An ATSC (Advanced Television Systems Committee) VSB (Vestigial Sideband) receiver includes a carrier tracking loop (CTL) for processing a received ATSC VSB signal and a CTL lock detector. The CTL lock detector includes an averaging filter for averaging the down-converted received ATSC VSB signal to provide a DC offset, an estimator for providing an estimate of the DC offset, and a comparator for providing a lock signal as a function of a comparison between the estimate of the DC offset and the DC offset, wherein the lock signal is representative of either a locked condition or an unlocked condition of the CTL.

10 Claims, 10 Drawing Sheets

FIG. 6

Table 1

| $s = \mid dc\_offset - estimated\ dc\_offset \mid$ | Lock signal 141 |
|---|---|
| $\leq$ threshold | 1 |
| $>$ threshold | 0 |

CARRIER TRACKING LOOP LOCK DETECTOR

This application is a national phase application and claims the benefit, under 35 U.S.C. § 365 of International Application PCT/US03/35941, filed Nov. 12, 2003, which was published in accordance with PCT Article 21(2) on Jun. 10, 2004 in English and which claims the benefit of U.S. provisional patent application Ser. No. 60/429,367, filed Nov. 26, 2002.

BACKGROUND OF THE INVENTION

The present invention generally relates to communications systems and, more particularly, to a receiver.

In the ATSC (Advanced Television Systems Committee) standard for digital terrestrial television (DTV) in the United States (e.g., see, United States Advanced Television Systems Committee, "ATSC Digital Television Standard", Document A/53, Sep. 16, 1995), the modulation system consists of a suppressed carrier vestigial sideband (VSB) modulation with an added small in-phase pilot at the suppressed carrier frequency, 11.3 dB below the average signal power. An illustrative spectrum for a ATSC VSB signal is shown in FIG. 1.

A typical ATSC-VSB receiver includes a carrier tracking loop (CTL) that processes a received ATSC VSB signal to both remove any frequency offsets between the local oscillator (LO) of the transmitter and LO of the receiver and to demodulate the received ATSC VSB signal down to baseband from an intermediate frequency (IF) or near baseband frequency (e.g., see, United States Advanced Television Systems Committee, "Guide to the Use of the ATSC Digital Television Standard", Document A/54, Oct. 4, 1995; and U.S. Pat. No. 6,233,295 issued May 15, 2001 to Wang, entitled "Segment Sync Recovery Network for an HDTV Receiver"). The CTL generally includes: a Hilbert filter and corresponding delay, a complex multiplier, a phase detector, a first order loop filter, with a proportional plus integrator path, a numeric controlled oscillator (NCO) and a sine-cosine lookup table. Generally, the ATSC receiver must detect whether the CTL is "locked" or "unlocked" to the received ATSC VSB signal. For example, if the ATSC receiver detects that the CTL is locked, then the ATSC receiver determines that the received ATSC VSB signal is "good" and can be used for subsequent recovery of the data conveyed therein. However, if the ATSC receiver detects that the CTL is unlocked, then the ATSC receiver determines that the received ATSC signal is "bad" such that portions of the ATSC receiver may then be reset to, e.g., flush out any recovered data now associated with the bad received ATSC VSB signal, i.e., erroneous data. In addition, after the ATSC receiver detects that the CTL is locked, the CTL loop filter parameter may be changed to decrease the loop bandwidth and reject thermal noise.

Typically, the ATSC receiver determines whether the CTL is locked by using the loop filter integrator of the CTL. For example, a threshold value is established and if a signal from the loop filter integrator of the CTL (the "lock signal") changes above the threshold value in a specified amount of time, the CTL is considered unlocked by the ATSC receiver. Unfortunately, the behavior of the loop filter integrator—and therefore the lock signal—is affected by impulse noise, thermal noise and loop bandwidth of the CTL. As a result, erroneous detections of locked and unlocked conditions may occur. For example, an unlocked condition may be falsely detected if the threshold is small compared with the noise power and loop bandwidth, or a locked condition may be falsely detected if the threshold is large compared with the noise power and loop bandwidth.

SUMMARY OF THE INVENTION

We have observed that when a carrier tracking loop (CTL) of an ATSC VSB receiver is actually locked, the carrier pilot present in the received ATSC VSB signal creates a DC offset in the CTL output signal (the down-converted received signal). As such, we have realized that this DC offset can be used to determine the locked condition of the CTL. In particular, the DC offset can be recovered by averaging the CTL output signal. Further, since the carrier pilot power is known to be 11.3 dB below the signal power, an estimated value of what the DC offset should be can be derived from the signal power of the CTL output signal. As such, a decision device can then be used to determine whether the CTL is in a locked condition or an unlocked condition as a function of the estimated value for the DC offset and the actual value of the DC offset. Indeed, this technique is applicable to any modulation system for which a carrier pilot is included in the transmitted signal and the receiver demodulates a corresponding received signal by down converting the received carrier pilot to DC.

Therefore, and in accordance with the principles of the invention, a receiver includes a CTL for down-converting a received signal to provide a down-converted received signal and a CTL lock detector for detecting, as a function of the down-converted received signal, whether the CTL is in a locked condition or an unlocked condition.

In an embodiment of the invention, a CTL lock detector averages a down-converted received signal to provide an average signal; estimates the average signal from the down-converted received signal; and determines whether the CTL is locked or unlocked as a function of the average signal and the estimate of the average signal.

In another embodiment of the invention, an ATSC VSB receiver includes a carrier tracking loop (CTL) for processing a received ATSC VSB signal to provide a down-converted received ATSC VSB signal and a CTL lock detector for determining if the CTL is in a locked condition or an unlocked condition as a function of the down-converted received ATSC VSB signal. The CTL lock detector includes an averaging filter for averaging the down-converted received ATSC VSB signal to provide a DC offset, an estimator for providing an estimate of the DC offset, and a comparator for providing a lock signal as a function of a comparison between the estimate of the DC offset and the DC offset, wherein the lock signal is representative of either a locked condition or an unlocked condition of the CTL.

BRIEF DESCRIPTION OF THE DRAWINGS

FIG. 6 shows an illustrative table for use in comparator 140 of FIG. 5;

DETAILED DESCRIPTION

Other than the inventive concept, the elements shown in the figures are well known and will not be described in detail. For example, other than the inventive concept, a television, and the components thereof, such as a front-end, Hilbert filter, carrier tracking loop, video processor, remote control, etc., are well known and not described in detail herein. In addition, the inventive concept may be implemented using conventional programming techniques, which, as such, will not be described herein. Finally, like-numbers on the figures represent similar elements.

Figure 1:
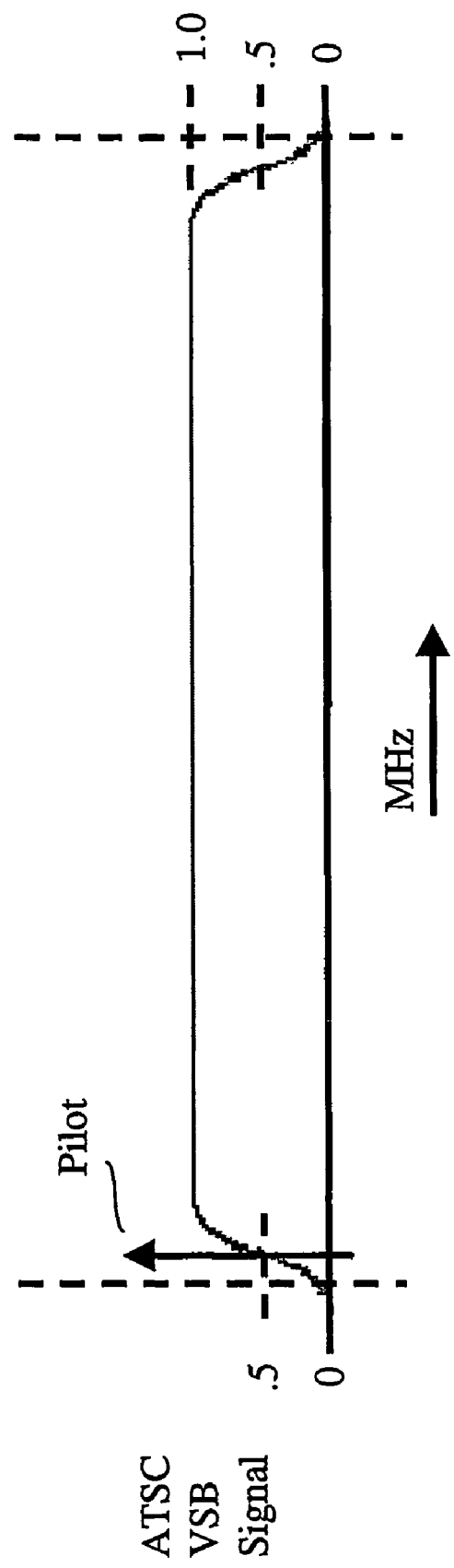
FIG. 1 shows an illustrative ATSC VSB signal spectrum.
Figure 2:
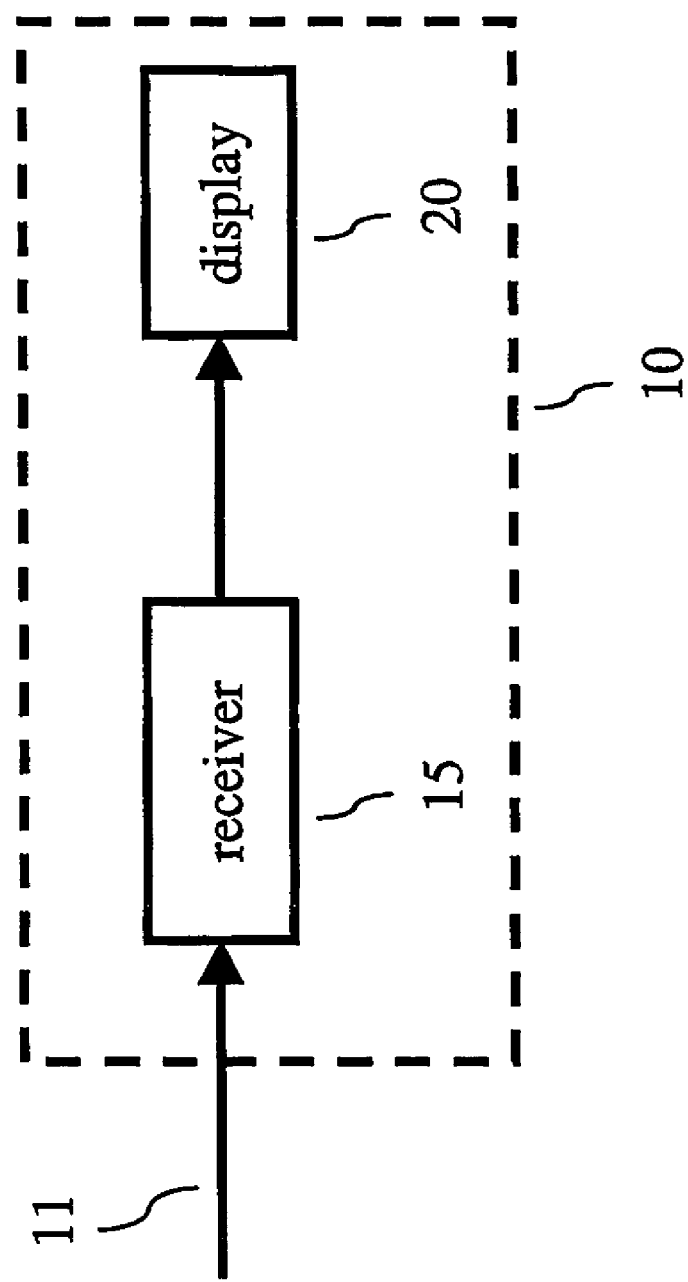
FIG. 2 shows an illustrative high-level block diagram of a TV set embodying the principles of the invention.

A high-level block diagram of an illustrative television set 10 in accordance with the principles of the invention is shown in FIG. 2. Television (TV) set 10 includes a receiver 15 and a display 20. Illustratively, receiver 15 is an ATSC-compatible receiver. It should be noted that receiver 15 may also be NTSC (National Television Systems Committee)-compatible, i.e., have an NTSC mode of operation and an ATSC mode of operation such that TV set 10 is capable of displaying video content from an NTSC broadcast or an ATSC broadcast. For simplicity in describing the inventive concept, only the ATSC mode of operation is described herein. Receiver 15 receives a broadcast signal 11 (e.g., via an antenna (not shown)) for processing to recover therefrom, e.g., an HDTV (high definition TV) video signal for application to display 20 for viewing video content thereon. As noted above, and shown in FIG. 1, signal 11 is typically representative of an ATSC VSB broadcast signal.

Figure 3:
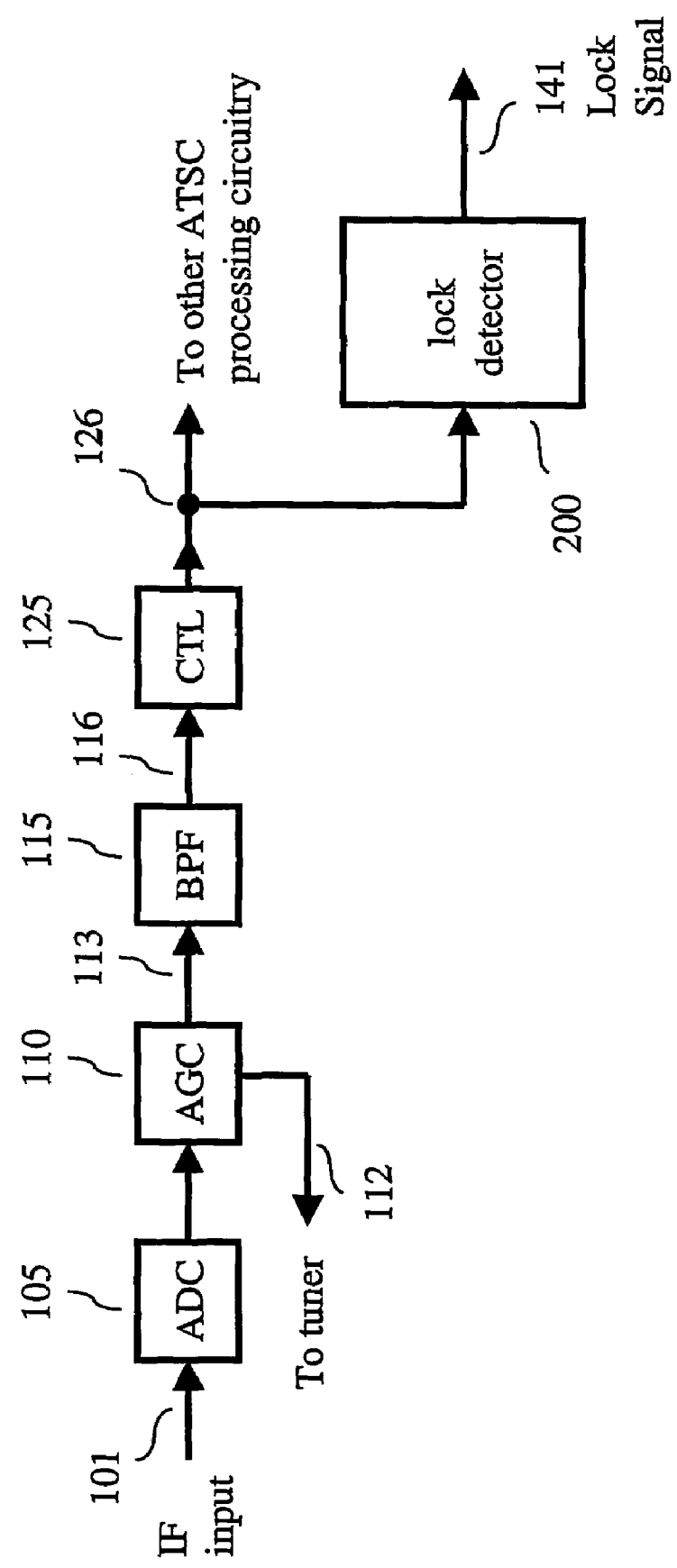
FIG. 3 shows a portion of a receiver embodying the principles of the invention.

Turning now to FIG. 3, that relevant portion of receiver 15 in accordance with the principles of the invention is shown. In particular, receiver 15 includes analog-to-digital converter (ADC) 105, automatic gain control (AGC) 110, band-pass filter (BPF) 115, carrier tracking loop (CTL) 125 and lock detector 200.

Input signal 101 represents a digital VSB modulated signal in accordance with the above-mentioned "ATSC Digital Television Standard" and is centered at a specific IF (Intermediate Frequency) of $F_{IF}$ Hertz. Input signal 101 is sampled by ADC 105 for conversion to a sampled signal, which is then gain controlled by AGC 110. The latter is noncoherent and is a mixed mode (analog and digital) loop that provides a first level of gain control (prior to carrier tracking), symbol timing and sync detection of the VSB signal included within signal 101. AGC 110 basically compares the absolute values of the sampled signal from ADC 105 against a predetermined threshold, accumulates the error and feeds that information, via signal 112, back to the tuner (not shown) for gain control prior to ADC 105. As such, AGC 110 provides a gain controlled signal 113 to BPF 115, which is centered at the IF frequency ($F_{IF}$) and has a bandwidth equal to 6 MHz (millions of hertz). The output signal 116 from BPF 115 is then passed through CTL 125, which is a phase locked loop that processes signal 116 to down convert the IF signal to baseband and correct for frequency offsets between the transmitter (not shown) of the broadcast ATSC video carrier and the receiver tuner Local Oscillator (not shown). CTL 125 is a second order loop, which, in theory, allows for frequency offsets to be tracked with no phase error. In practice, phase error is a function of the loop bandwidth, input phase noise, thermal noise and implementation constraints like bit size of the data, integrators and gain multipliers. CTL 125 provides a down-converted received signal 126. The latter is provided to other portions (not shown) of receiver 15 for recovery of the data conveyed therein and, in accordance with the principles of the invention, is also provided to lock detector 200 (described below), which provides a lock signal 141 as a function of the down-converted received signal 126.

Figure 4:
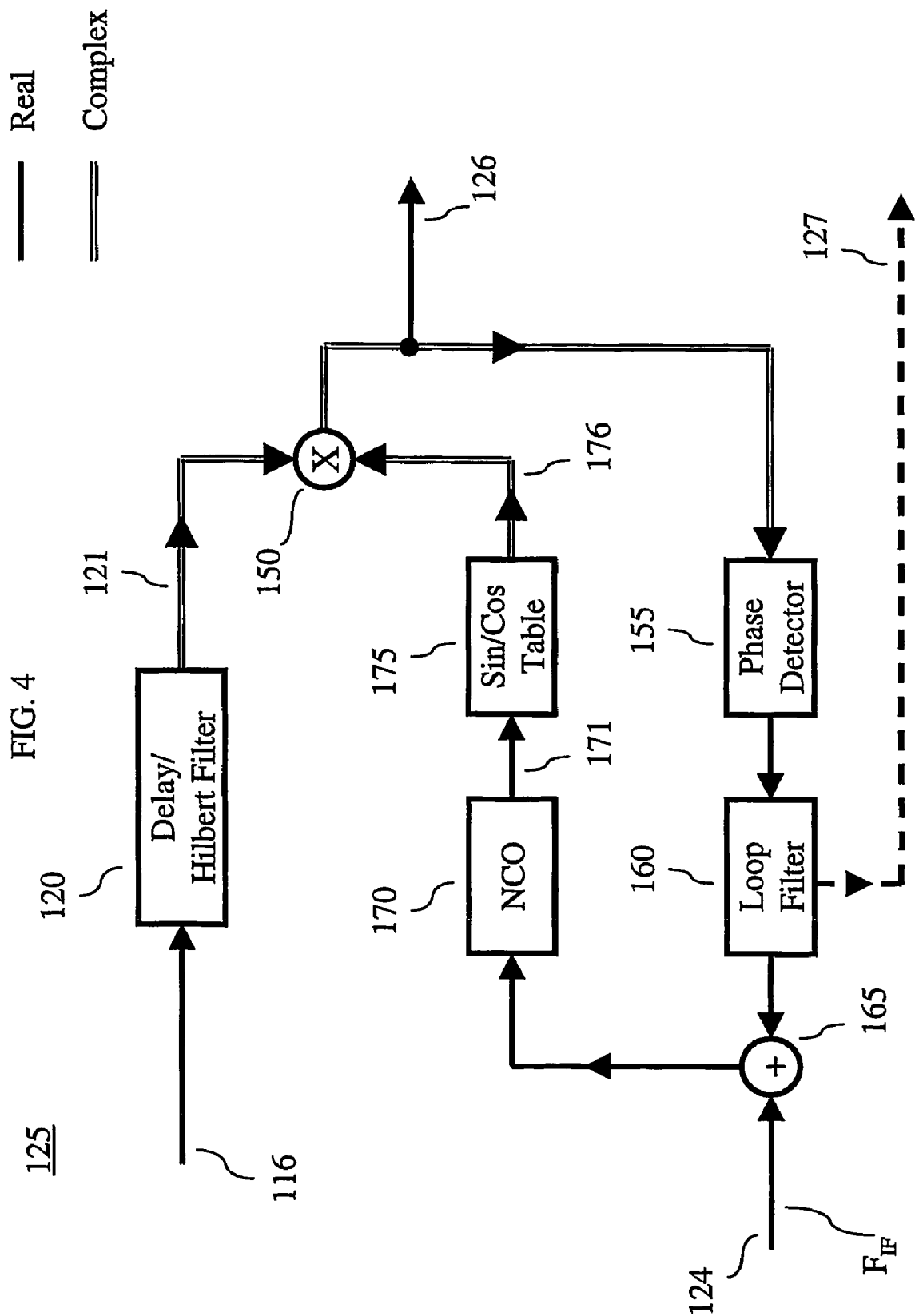
FIG. 4 shows an illustrative carrier tracking loop for use in the receiver of FIG. 3.

Before describing lock detector 200, reference should be made to FIG. 4, which shows an illustrative embodiment of CTL 125. CTL 125 includes delay/Hilbert filter element 120, complex multiplier 150, phase detector 155, loop filter 160, combiner (or adder) 165, numerically controlled oscillator (NCO) 170 and sine/cosine (sin/cos) table 175. It should be noted that other carrier tracking loop designs are possible, as long as they achieve the same performance.

Delay/Hilbert filter element 120 includes a Hilbert filter and an equivalent delay line that matches the Hilbert filter processing delay. As known in the art, a Hilbert Filter is an all-pass filter that introduces a −90° phase shift to all input frequencies greater than 0 (and a +90° degree phase shift to negative frequencies). The Hilbert filter allows recovery of the quadrature component of the output signal 116 from BPF 115. In order for the CTL to correct the phase and lock to the ATSC IF carrier both the in-phase and quadrature components of the signal are needed.

The output signal 121 from delay/Hilbert filter element 120 is a complex sample stream comprising in-phase (I) and quadrature (Q) components. It should be noted that complex signal paths are shown as double lines in the figures. Complex multiplier 150 receives the complex sample stream of signal 121 and performs de-rotation of the complex sample stream by a calculated phase angle. In particular, the in-phase and quadrature components of signal 121 are rotated by a phase. The latter is provided by signal 176, which represents particular sine and cosine values provided by sin/cos table 175 (described below). The output signal from complex multiplier 150, and for that matter CTL 125, is down-converted received signal 126, which represents a de-rotated complex sample stream. As can be observed from FIG. 4, down-converted received signal 126 is also applied to phase detector 155, which computes any phase offset still present in the down-converted signal 126 and provides a phase offset signal indicative thereof. This computation can be performed with a "I*Q" or a "sign(I)*Q" function. The phase offset signal provided by phase detector 155 is applied to loop filter 160, which is a first order filter with proportional-plus-integral gains. Ignoring for the moment combiner 165, the loop filtered output signal from loop filter 160 is applied to NCO 170. The latter is an integrator, which takes as an input signal a frequency, and provides an output signal representative of phase angles associated with the input frequency. However, in order to increase the acquisition speed, the NCO is fed a frequency offset, $F_{OFFSET}$, corresponding to $F_{PILOT}$ (the frequency of the carrier pilot tone present in the VSB signal), which is added to the loop filter output signal via combiner 165 to provide a combined signal to NCO 170. NCO 170 provides an output phase angle signal 171 to sin/cos table 175, which provides the associated sine and cosine values to complex multiplier 150 for de-rotation of signal 121 to provide down-converted received signal 126. It should also be noted, and as mentioned earlier, that loop filter 160 may also be used to provide a lock signal 127, which is shown in dashed line form on FIG. 4.

As noted above, we have observed that when a carrier tracking loop (CTL) of an ATSC VSB receiver is actually locked, the carrier pilot present in the received ATSC VSB signal creates a DC offset in the CTL output signal (the down-converted received signal). As such, we have realized that this DC offset can be used to determine the locked condition of the CTL. In particular, the DC offset can be recovered by averaging the CTL output signal. Further, since the carrier pilot power is known to be 11.3 dB below the signal power, an estimate of what the DC offset should be can be derived from the signal power of the CTL output signal. As such, a decision device can then be used to determine whether the CTL is in a locked condition or an unlocked condition as a function of the estimated value of the DC offset and the actual value of the DC offset. Indeed, this technique is applicable to any modulation system for which a carrier pilot is included in the transmitted signal and the receiver demodulates a corresponding received signal by down converting the received carrier pilot to DC.

Figure 5:
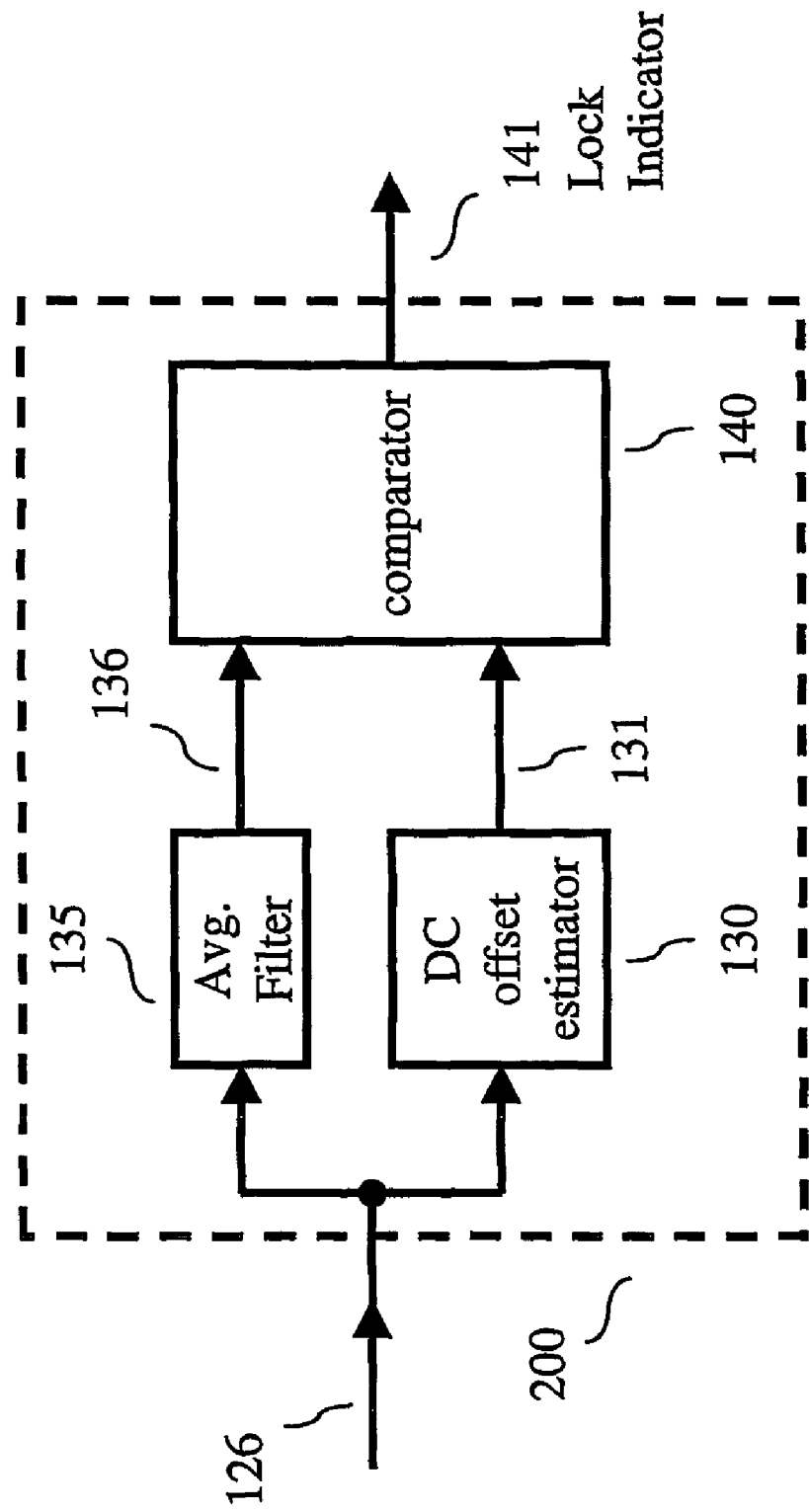
FIG. 5 shows an embodiment of a lock detector in accordance with the principles of the invention.

In view of the above, and in accordance with the principles of the invention, lock detector 200 of FIG. 3 provides a lock signal 141 as a function of the down-converted received signal 126, where the lock signal 141 is representative of either a locked condition or an unlocked condition of CTL 125. Illustratively, lock detector 200 utilizes the DC offset of the carrier pilot present in the down-converted received signal 126 for determining the locked or unlocked condition. Reference to FIG. 5 shows an illustrative embodiment of lock detector 200. Lock detector 200 comprises averaging (avg.) filter 135, DC offset estimator 130 and comparator 140. The down-converted received signal 126 is applied to avg. filter 135 and DC offset estimator 130. The former is a filter of relatively low bandwidth (approximately 1 KHz (thousands of hertz) or less) that averages the down-converted received signal 126 and provides DC offset signal 136, which is representative of whether or not the carrier pilot is present. Since the carrier pilot power is known to be 11.3 dB below the signal power, DC offset estimator 130 estimates what the value of the DC offset should be from the down-converted received signal. Illustratively, this estimated value is derived from the power-level of the down-converted received signal. For example, DC offset estimator 130 estimates the DC offset by first determining the power level of the down-converted received signal from the following equation:

$$P_{VSB} = \frac{1}{N}\sum_{i=1}^{N}(r_i^2) \quad (1)$$

where $r_i$ is a sample of the down-converted received signal at time i and N is the number of samples used in the estimation. Once a value for $P_{VSB}$ is determined, DC offset estimator 130 then determines the estimated DC offset, as represented by estimated DC offset signal 131, which is proportional to the square root of $P_{VSB}$ by, e.g., addressing a predefined lookup table (not shown) that maps individual values of $P_{VSB}$ to respective estimated DC offset values.

As can be observed from FIG. 5, the DC offset signal 136 and the estimated DC offset signal 131 are applied to a decision device such as comparator 140. The latter is used to determine whether CTL 125 is in a locked condition or an unlocked condition as a function of the estimated value for the DC offset and the actual value of the DC offset. Illustratively, comparator 140 implements a simple function that performs a comparison based on a predefined threshold. For example, comparator 140 first calculates a value, s, which is the absolute value of the difference between the DC offset and the estimate of the DC offset, or:

$$s=|DC\ offset-estimate\ of\ the\ DC\ offset|. \quad (2)$$

If the value of s is within a specified threshold, then CTL 125 is locked; otherwise CTL 125 is unlocked. For example, when CTL 125 is, in fact, locked for a period of time, the estimate of the DC offset value approximates the actual DC offset, i.e., the value of s will approximate zero. However, as CTL 125 begins to drift, the actual DC offset will begin to drop in value—thus, causing the value of s to increase. This is illustrated in Table 1 of FIG. 6, which shows the value of lock signal 141 as a function of the comparison between DC offset signal 136 and estimated DC offset signal 131. If s is less than or equal to the predefined threshold, than lock signal 141 is set to represent a locked state, e.g., a logic level of "1." Otherwise, lock signal 141 is set to represent an unlocked state, e.g., a logic level of "0." An illustrative threshold value could be a fraction of the estimated DC offset value, e.g., one eighth of the estimated DC offset value.

Figure 7:
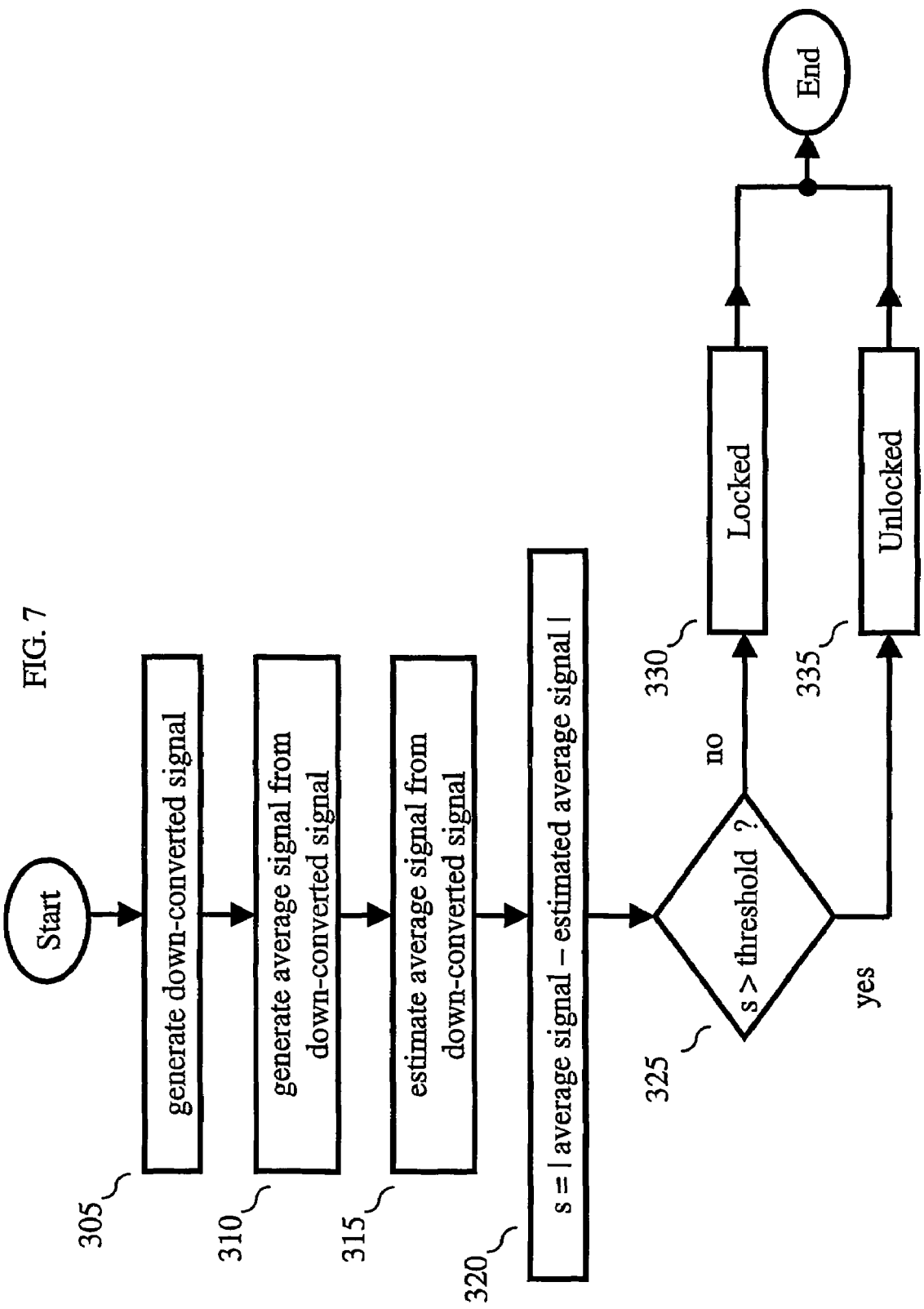
FIG. 7 shows an illustrative method in accordance with the principles of the invention.

Turning now to FIG. 7, an illustrative flow chart in accordance with the principles of the invention is shown. In step 305, receiver 15 down converts a received signal to generate a down-converted signal. In step 310, receiver 15 averages the down-converted signal to provide an average signal (e.g., the above-described DC offset signal). In step 315, receiver 15 generates an estimate of the average signal (e.g., the above-described estimated DC offset signal) from the down-converted signal. In step 320, receiver 15 determines the value of a parameter s (e.g., equation (2), above). In step 325, receiver 15 compares the value of s to a predetermined threshold. If the value of s is greater than the predetermined threshold, then receiver 15 determines that the CTL is unlocked in step 335. On the other hand, if the value of s is less than, or equal to, the predetermined threshold, then receiver 15 determines that the CTL is locked in step 330.

It should be noted that since lock detector 200 is placed outside of the carrier tracking loop, lock detector 200 is less dependent on the carrier tracking loop parameters and bandwidth. Advantageously, the averaging filter and DC offset estimator bandwidth can be set to practically eliminate the noise influence on the lock detector without affecting the tracking ability of the carrier tracking loop, making lock detector 200 more reliable.

Figure 8:
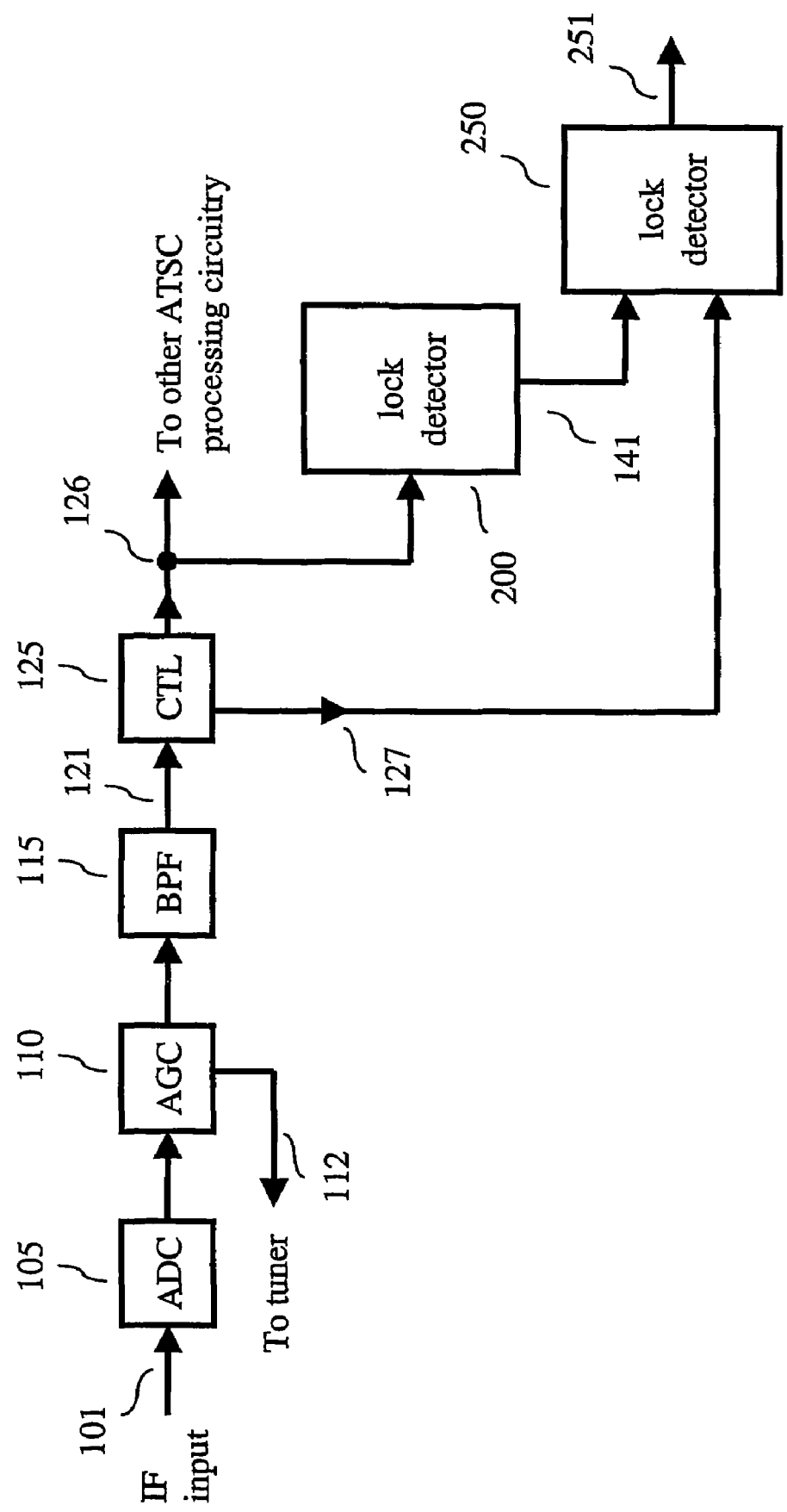
FIGS. 8-10 show other embodiments in accordance with the principles of the invention.

Another embodiment in accordance with the principles of the invention is shown in FIG. 8. The embodiment of FIG. 8 is similar to that shown in FIG. 3 except that an additional lock detector 250 is shown. As noted earlier, CTL 125 may provide a lock signal 127 from, e.g., loop filter 160. Further, as described above, lock detector 200 provides lock signal 141. In accordance with a feature of the invention, lock detector 250 uses a combination of lock signal 127 and lock signal 141 for generating another lock signal 251 as indicative of whether or not CTL 125 is either locked or unlocked. For example, lock detector 250 may simply logically "OR" the two signals together. It should be noted that although shown as a separate element, lock detector 250 may also be a part of lock detector 200, which would then be modified to also receive lock signal 127 from CTL 125. In the embodiment exemplified by FIG. 8, lock signal 127 reflects a short term behavior of the CTL (high bandwidth) while lock signal 141 reflects a long term behavior of the CTL (low bandwidth). As such, lock signal 127 and lock signal 141 can be used together to indicate the presence of impulse noise, thermal noise or phase noise, in the received signal data.

Figure 9:
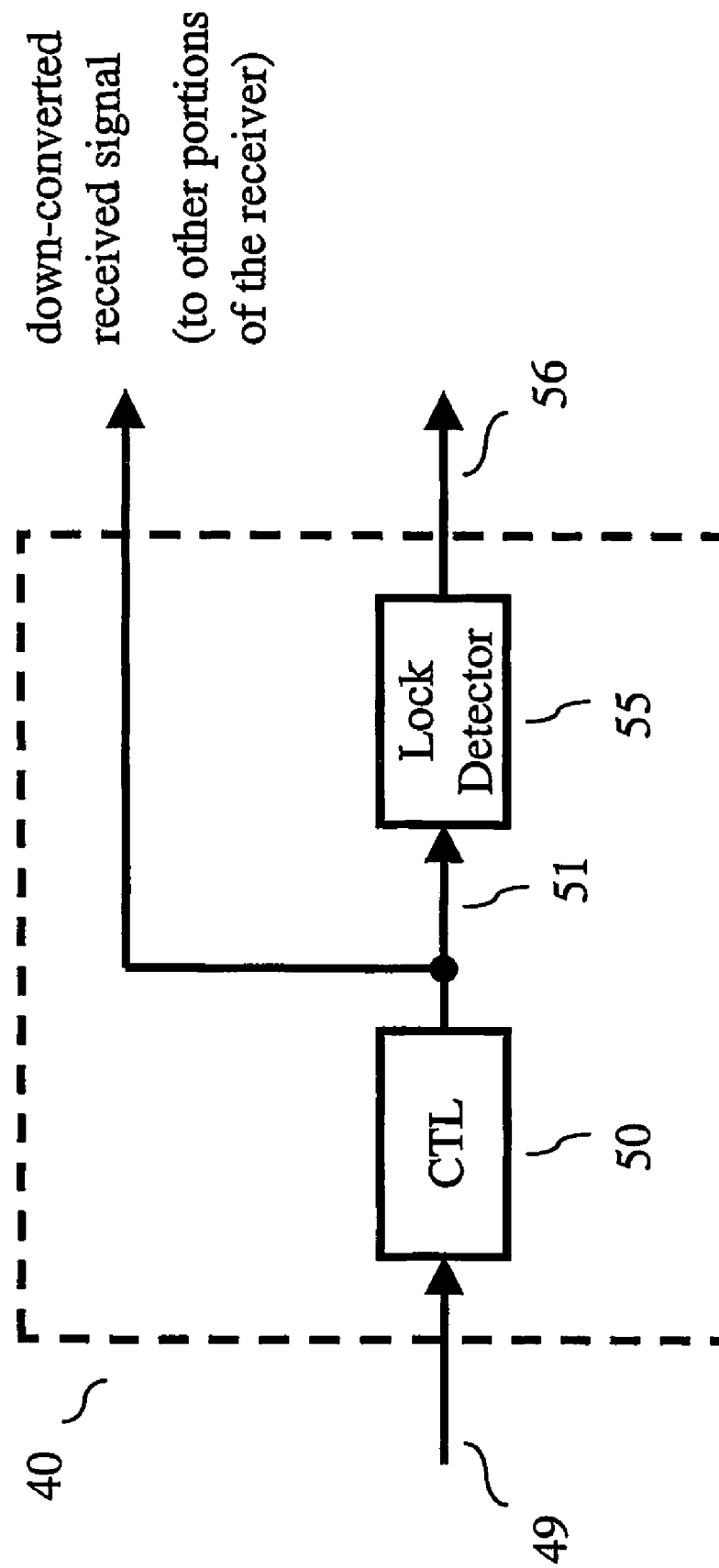

Although the inventive concept was described above in the context of an ATSC VSB television receiver, the inventive concept is not so limited and applies to any receiver that down-converts a received signal that includes a pilot carrier. Turning now to FIG. 9, another embodiment in accordance with the principles of the invention is shown. A portion 40 of a receiver, e.g., receiver 15 of FIG. 2, includes carrier tracking loop (CTL) 50 and lock detector 55. A received signal 49, including a pilot carrier signal, is applied to CTL 50, which provides down-converted output signal 51 to lock detector 55. As can be observed from FIG. 7, down-converted output signal 51 is also available for processing by other portions (not shown) of the receiver for recovery of data conveyed therein. In accordance with the principles of the invention, lock detector 55 determines if CTL 50 is in a locked condition or an unlocked condition as a function of down-converted output signal 51. Lock detector 55 provides lock signal 56, which is representative of the locked or unlocked condition of CTL 50. Illustratively, CTL 50 and lock detector 55 may include elements similar to those shown and described above with respect to FIGS. 3, 4 and 5 but are not so limited.

Figure 10:
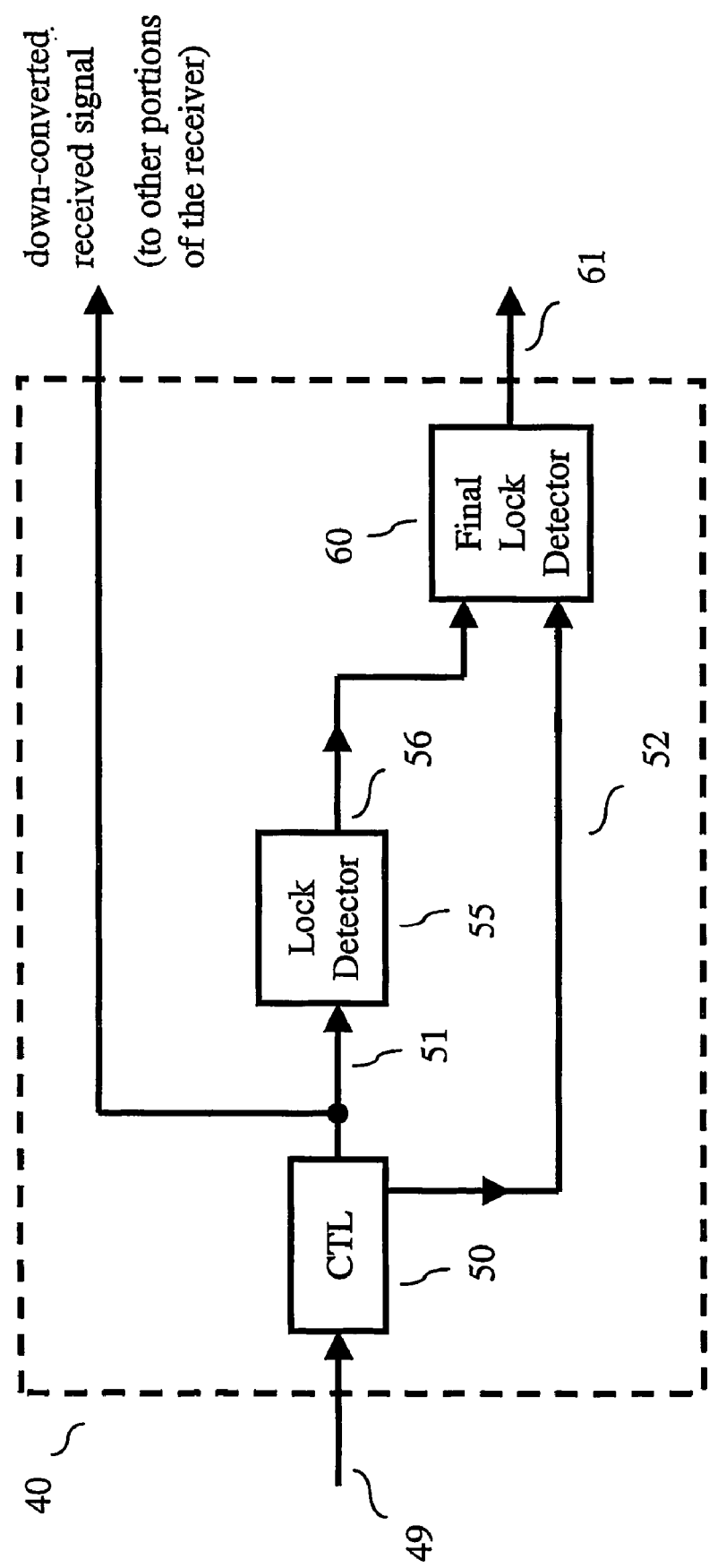

FIG. 10 shows another illustrative embodiment in accordance with the principles of the invention. The embodiment of FIG. 10 is similar to the embodiment of FIG. 9, described above, except for the addition of final lock detector 60. In particular, in this embodiment a lock condition is represented by a value of signal 61. The latter is provided by final lock detector 60 which determines whether or not an actual lock condition is present as a function of at least both lock signal 56 (provided from lock detector 55) and lock signal 52, which is provided from CTL 50 by, e.g., the earlier noted loop filter (e.g., loop filter 160 of FIG. 4). For example, final lock detector 55 indicates a lock condition only if both lock signal 56 and lock signal 52 are representative of a lock condition.

It should also be noted that groupings of components for particular elements described and shown herein are merely illustrative. For example, although FIG. 4 shows a Hilbert filter internal to the carrier tracking loop, this is not required and, e.g., the Hilbert filter could have been shown in FIG. 3 and described as external to the carrier tracking loop.

As such, the foregoing merely illustrates the principles of the invention and it will thus be appreciated that those skilled in the art will be able to devise numerous alternative arrangements which, although not explicitly described herein, embody the principles of the invention and are within its spirit and scope. For example, although illustrated in the context of separate functional elements, these functional elements may be embodied on one or more integrated circuits (ICs). Similarly, although shown as separate elements, any or all of the elements may be implemented in a stored-program-controlled processor, e.g., a digital signal processor, which executes associated software, e.g., corresponding to one or more of the steps shown in FIG. 7. Further, although shown as elements bundled within TV set 10, the elements therein may be distributed in different units in any combination thereof. For example, receiver 15 of FIG. 2 may be a part of a device, or box, physically separate from the device, or box, incorporating display 20, etc. Also it should be noted that although the down-converted received signal was illustratively averaged, other statistical functions may be used along with respective modifications to, e.g., step 315 of FIG. 7. It is therefore to be understood that numerous modifications may be made to the illustrative embodiments and that other arrangements may be devised without departing from the spirit and scope of the present invention as defined by the appended claims.

The invention claimed is:

1. Apparatus for use in a receiver, the apparatus comprising:
   a carrier tracking loop (CTL) for down-converting a received signal to provide a down-converted received signal;
   a CTL lock detector for detecting, as a function of the down-converted received signal, whether the CTL is in a locked condition or an unlocked condition, wherein the CTL lock detector provides a lock signal representative of the locked condition or the unlocked condition; and
   another lock detector for use in determining the locked condition of the CTL as a function of the lock signal and another signal from the CTL that is also representative of a locked condition of the CTL.

2. The apparatus of claim 1, wherein the CTL lock detector comprises:
   an averaging filter for averaging the down-converted received signal to provide an average signal;
   a signal estimator responsive to the down-converted received signal for providing an estimated signal, which is representative of an estimate of the average signal; and
   a decision device for providing a lock signal as a function of the estimated signal and the average signal.

3. The apparatus of claim 2, wherein the decision device is a comparator that compares the estimated signal to the average signal for determining that the CTL is either in the locked condition or the unlocked condition.

4. The apparatus of claim 1, wherein the received signal is an ATSC (Advanced Television Systems Committee) VSB (Vestigial Sideband) modulation signal.

5. Apparatus for use in an ATSC (Advanced Television Systems Committee) VSB (Vestigial Sideband) receiver, the apparatus comprising:
   a carrier tracking loop responsive to a received ATSC VSB signal for providing a down-converted ATSC signal; and
   a carrier tracking loop lock detector for determining if the CTL is in a locked condition or an unlocked condition as a function of the down-converted ATSC signal;
   wherein the carrier tracking loop lock detector comprises:
      an averaging filter for averaging the down-converted ATSC signal to provide an average value of the down-converted ATSC signal;
      an estimator responsive to the down-converted ATSC signal for providing an estimated value of the average value; and
      a comparator for determining if the CTL is in a locked condition or an unlocked condition as a function of a comparison between the average value and the estimated value.

6. The apparatus of claim 5, wherein the carrier tracking loop lock detector provides a lock signal representative of the locked condition or the unlocked condition.

7. The apparatus of claim 6, further including another lock detector for use in determining the locked condition of the CTL as a function of the lock signal and another signal from the CTL that is also representative of a locked condition of the CTL.

8. A method for use in an ATSC (Advanced Television Systems Committee) VSB (Vestigial Sideband) receiver, the method comprising the steps of:
   using a carrier tracking loop for processing a received ATSC VSB signal to provide a down-converted ATSC signal; and
   determining if the CTL is in a locked condition or an unlocked condition as a function of the down-converted ATSC signal;
   wherein the determining step includes the steps of:
      averaging the down-converted ATSC signal to provide an average value of the down-converted ATSC signal;
      estimating, from the down-convened ATSC signal, the average value; and
      determining if the CTL is in a locked condition or an unlocked condition as a function of a comparison between the average value and the estimated value.

9. The method of claim 8, further comprising the step of providing a lock signal representative of the locked condition or the unlocked condition.

10. The method of claim 9, further comprising the step of determining the lock condition of the CTL as a function of the lock signal and a signal from the CTL that is also representative of a locked condition of the CTL.

* * * * *